United States Patent
Anjo et al.

(10) Patent No.: US 7,370,123 B2
(45) Date of Patent: May 6, 2008

(54) INFORMATION PROCESSING APPARATUS (75) Inventors: Kenichiro Anjo, Kanagawa (JP); Katsumi Togawa, Kanagawa (JP); Ryoko Sasaki, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 382 days.

(21) Appl. No.: 11/246,478

(22) Filed: Oct. 11, 2005

(65) Prior Publication Data
US 2006/0080479 A1  Apr. 13, 2006

(30) Foreign Application Priority Data
Oct. 12, 2004  (JP) ............... 2004-297639

(51) Int. Cl.
*G06F 3/00* (2006.01)
*G06F 15/00* (2006.01)

(52) U.S. Cl. ............... 710/20; 710/5; 710/22; 710/52; 712/18; 712/34; 712/225; 712/226

(58) Field of Classification Search ......... 710/5–7, 710/20–22, 33, 52; 712/10, 18, 21–22, 34, 712/225, 226; 714/732; 716/3
See application file for complete search history.

(56) References Cited

U.S. PATENT DOCUMENTS

| | | | |
|---|---|---|---|
| 5,961,640 A | | 10/1999 | Chambers et al. |
| 6,163,820 A | * | 12/2000 | Garrett et al. ............ 710/33 |
| 6,477,560 B1 | | 11/2002 | Murayama et al. |
| 6,675,238 B1 | * | 1/2004 | Coffman et al. ............ 710/46 |
| 6,782,465 B1 | * | 8/2004 | Schmidt ............ 711/208 |
| 6,789,147 B1 | | 9/2004 | Kessler et al. |
| 6,868,458 B2 | * | 3/2005 | Kim ............ 710/28 |
| 2002/0013867 A1 | * | 1/2002 | Matsuki et al. ............ 710/22 |
| 2002/0144027 A1 | * | 10/2002 | Schmisseur ............ 710/22 |
| 2003/0051050 A1 | * | 3/2003 | Adelaide et al. ............ 709/238 |
| 2003/0126404 A1 | | 7/2003 | Anjo et al. |
| 2003/0221086 A1 | | 11/2003 | Simovish et al. |
| 2004/0184457 A1 | | 9/2004 | Gregorio et al. |
| 2006/0161696 A1 | * | 7/2006 | Anjo et al. ............ 710/22 |
| 2006/0179180 A1 | * | 8/2006 | Sugita et al. ............ 710/22 |
| 2006/0277545 A1 | * | 12/2006 | Togawa et al. ............ 718/100 |
| 2007/0022249 A1 | * | 1/2007 | Togawa et al. ............ 711/123 |

FOREIGN PATENT DOCUMENTS

| | | |
|---|---|---|
| JP | 05-204828 | 8/1993 |
| JP | 6-250965 | 9/1994 |
| JP | 10-224410 | 8/1998 |
| JP | 11-149387 | 6/1999 |
| JP | 2000-067008 A | 3/2000 |
| JP | 2003-196246 | 7/2003 |
| JP | 2003-216591 | 7/2003 |
| WO | WO 99/59078 | 11/1999 |

* cited by examiner

*Primary Examiner*—Christopher Shin
(74) *Attorney, Agent, or Firm*—Foley & Lardner LLP (57) ABSTRACT

A descriptor queue composed of descriptors containing input address information that represents an address for storing data to be processed and output address information that represents an address for storing processed data is constructed and stored in a memory. A stream processor for performing a plurality of processes parallel to each other on the data to be processed acquires a descriptor from the memory, reads data to be processed from the memory according to the input address information contained in the descriptor, processes the data, and stores the processed data back into the memory according to the output address information contained in the descriptor.

26 Claims, 6 Drawing Sheets

Desc_ptr: descriptor pointer
c: write completion flag
v: validity flag

INFORMATION PROCESSING APPARATUS

BACKGROUND OF THE INVENTION

1. Field of the Invention

The present invention relates to an information processing apparatus, and more particularly to an information processing apparatus having a processor dedicated to performing a particular processing sequence.

2. Description of the Related Art

Figure 1:
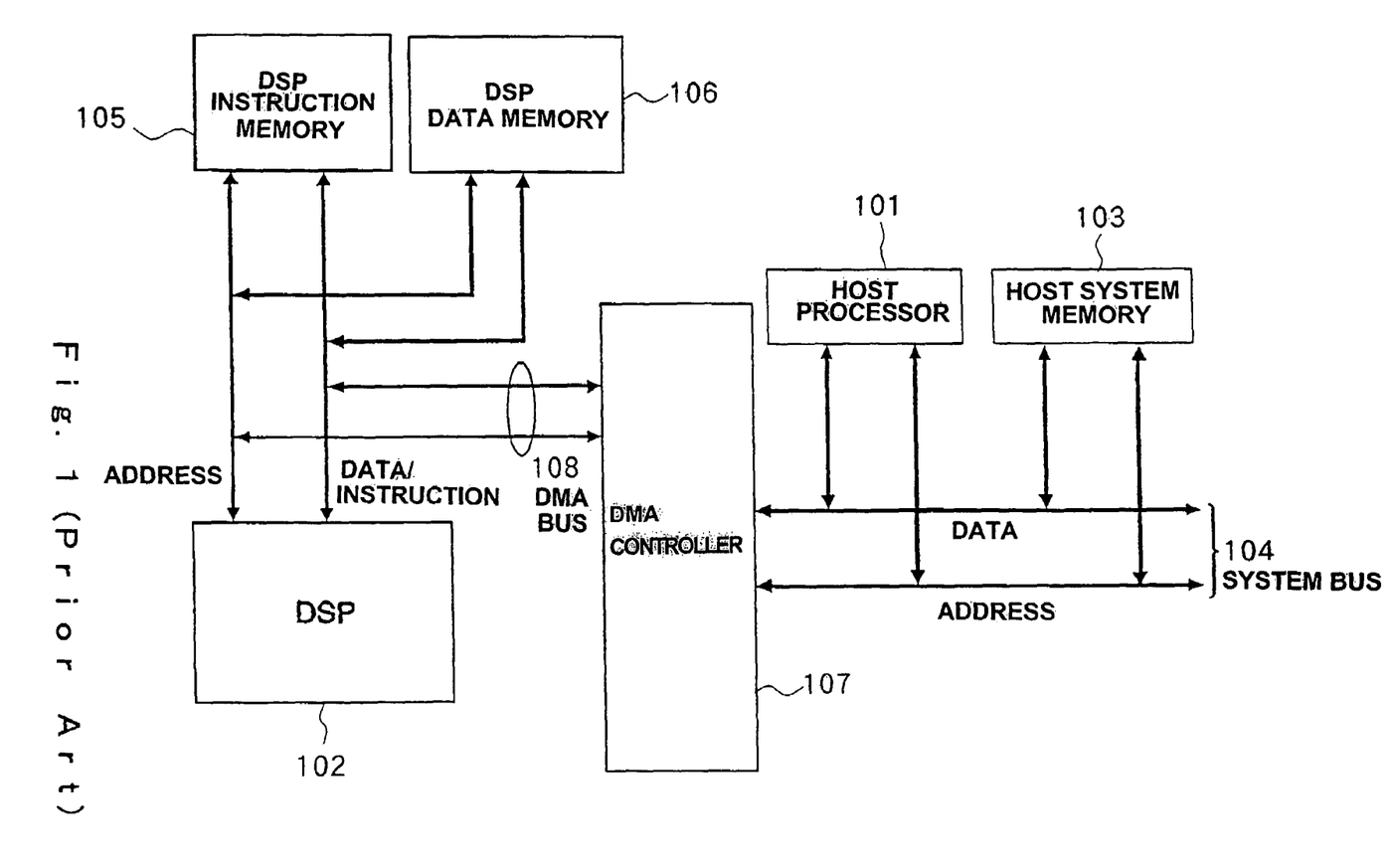
FIG. 1 is a block diagram of a conventional information processing apparatus.

Information processing apparatus available in recent years are finding growing use because of their increasing processing capability. The information processing apparatus are required to carry out more sophisticated processing operation or to process large amounts of data such as still image data and moving image data at higher speeds. According to one known solution, an information processing apparatus has a DSP (Digital Signal Processor) separate from a host processor and dedicated to performing a particular processing sequence such as a still image processing sequence or a moving image processing sequence. A conventional information processing apparatus having such a DSP is illustrated in FIG. 1 of the accompanying drawings. FIG. 1 shows in block form an information processing apparatus disclosed in Japanese laid-open patent publication No. H05-204828.

As shown in FIG. 1, the conventional information processing apparatus has host processor 101, DSP 102, DSP instruction memory 105 for temporarily storing instructions to be supplied to DSP 102, DSP data memory 106 for temporarily storing data to be processed or data processed by DSP 102, host system memory 103 for storing data to be processed and data processed by host processor 101 and DSP 102, and DMA controller 107 for controlling the transmission of data and instructions to and the reception of data and instructions from DSP 102.

Host processor 101 and host system memory 103 are connected to each other by system bus 104, and DSP 102, DSP instruction memory 105, and DSP data memory 106 are connected to each other by DMA bus 108. Host processor 101 and DSP 102 are connected to each other for exchanging data and instructions by DMA controller 107 which provides a link between system bus 104 and DMA bus 108.

In the information processing apparatus shown in FIG. 1, since DSP 102 performs a particular processing sequence, the processing burden on host processor 101 is reduced. In addition, DSP 102 has a shorter processing time than host processor 101 because DSP 102 is dedicated to performing a particular process for which DSP 102 is designed.

If host processor 101 asks DSP 102 to perform a certain process, host processor 101 sends DSP 102 a "data transfer packet request list" including addresses of host system memory 103 where data to be processed are stored, addresses of DSP data memory 106 where the data are to be stored, and information representing the data size. When DSP 102 receives the "data transfer packet request list", DSP 102 extracts the addresses of host system memory 103, the addresses of DSP data memory 106, and the information representing the data size from the "data transfer packet request list". Based on the extracted addresses and the data size, DSP 102 activates DMA controller 107 and controls DMA controller 107 to read the data whose size has been indicated from the addresses of host system memory 103 and sends the read data by way of DMA transfer to the addresses of DSP data memory 106. DSP 102 then performs a programmed process on the data transferred to DSP data memory 106 according to instructions stored in DSP instruction memory 105, for example, and stores the processed data back into DSP data memory 106.

When the process is over, DSP 102 activates DMA controller 107, sends the processed data through DMA controller 107 to host system memory 103, and stores the processed data back into host system memory 103, based on another "data transfer packet request list".

For further improving the processing capability, the above information processing apparatus may additionally have a plurality of subprocessors including microprocessors, DSPs, etc. for performing a plurality of processing sequences parallel to each other. However, the information processing apparatus with the subprocessors is unable to keep the order of input data supplied to the subprocessors and the order of output data received from the subprocessors equal to each other.

For example, a DSP performs a process on each item of input data in the order in which the data are input, and outputs the processed data in the order in which they are processed. In the conventional information processing apparatus with one DSP as shown in FIG. 1, therefore, processed data may be received in the order in which the data are transferred to the DSP, and the host processor can associate the input data and the output data with each other.

If an information processing apparatus has a plurality of DSPs as subprocessors and the DSPs have different processing times that are required to process data, then DSPs having shorter processing times output processed data earlier, so that the order of input data supplied to the DSPs and the order of output data received from the DSPs are different from each other. Accordingly, the information processing apparatus with plural DSPs needs some scheme for managing an association between the input data and the output data in order to recognize which input data have produced processed output data.

If a complex hardware arrangement or increased complex processing is required in order to manage an association between the input data and output data, then it will offset the increase that is achieved in the processing capability of the information processing apparatus by performing a plurality of processes parallel to each other. Therefore, for performing a plurality of processes parallel to each other using subprocessors, it is desirable to construct a system for transferring data to the subprocessors highly efficiently, minimizing information required for management, and eliminating wasteful response wait times due to conflicts between the subprocessors and the CPU.

SUMMARY OF THE INVENTION

It is an object of the present invention to provide an information processing apparatus which is capable of associating output data with input data even when the information processing apparatus performs a plurality of processes parallel to each other.

To achieve the above object, there is provided in accordance with the present invention an information processing apparatus comprising a memory for storing a descriptor containing input address information representative of an address for storing data to be processed and output address information representative of an address for storing processed data, and a stream processor for performing a plurality of processes parallel to each other by acquiring the descriptor from the memory, reading data to be processed from the memory according to the input address information contained in the descriptor, processing the data, and storing the processed data back into the memory according to the output address information contained in the descriptor.

The above information processing apparatus is capable of managing an association between input data, i.e., data to be processed, and output data, i.e., processed data, using the information contained in the descriptor.

Therefore, even when the information processing apparatus performs a plurality of processes parallel to each other on the data to be processed, the information processing apparatus is capable of associating the output data with the input data.

The above and other objects, features, and advantages of the present invention will become apparent from the following description with reference to the accompanying drawings which illustrate examples of the present invention.

DETAILED DESCRIPTION OF THE PREFERRED EMBODIMENT

Figure 2:
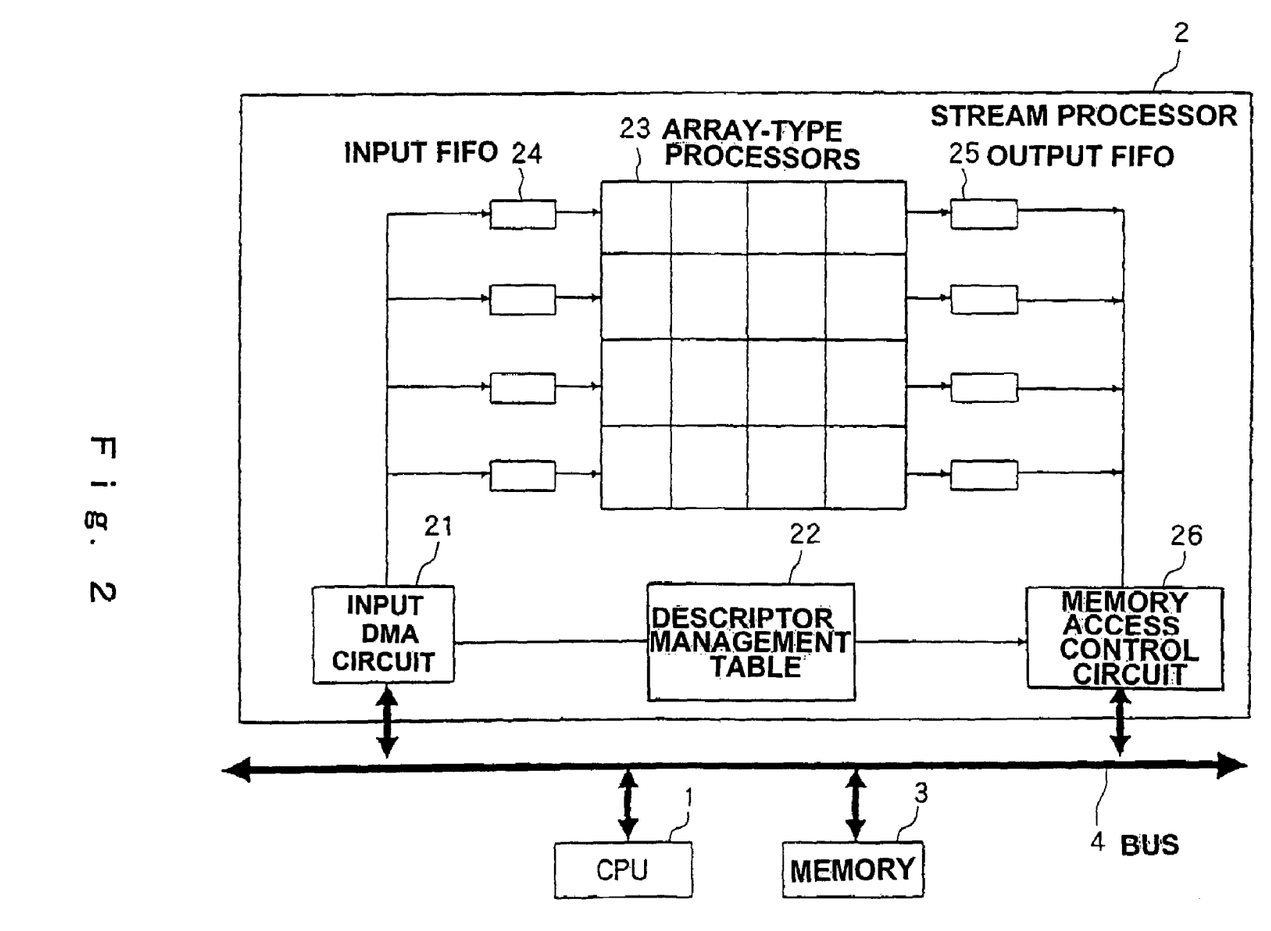
FIG. 2 is a block diagram of an information processing apparatus according to an embodiment of the present invention.

FIG. 2 shows in block form an information processing apparatus according to an embodiment of the present invention.

As shown in FIG. 2, the information processing apparatus has CPU 1 serving as a host processor, stream processor 2 capable of performing a plurality of processes parallel to each other, and memory 3 for storing data to be processed and data processed by CPU 1 and stream processor 2. CPU 1, stream processor 2, and memory 3 are interconnected by bus 4 for receiving data from and sending data to each other. Memory 3 stores, together with data to be processed and data processed by CPU 1 and stream processor 2, descriptors including various items of information used to identify those data. The host processor, which is illustrated as CPU 1 in FIG. 2, may not necessarily be a CPU, but may be a DSP or any of various other processing units insofar as it can process and control data in the information processing apparatus in its entirety.

Stream processor 2 comprises input DMA circuit 21 for reading data to be processed from memory 3, descriptor management table 22 for managing descriptors, a plurality of array-type processors 23 for performing a plurality of processes parallel to each other, a plurality of input FIFOs 24 for temporarily storing data (input data) to be supplied to array-type processors 23, a plurality of FIFOs 25 for temporarily storing data (output data) output from array-type processors 23, and memory access control circuit 26 for storing processed data (output data) from array-type processors 23 back into memory 3. Each input DMA circuit 21, descriptor management table 22, and memory access control circuit 26 may be constructed of logic circuits and memories, and may have a CPU or a DSP and a memory, for performing various functions, to be described below, of stream processor 2 with the CPU or the DSP according to a program stored in the memory.

In stream processor 2, array-type processors 23 (referred to as "processor group") are arranged in a matrix. Stream processor 2 has a plurality of channels (processing paths) in which the respective processes are performed by array-type processors 23. Input FIFOs 24 and output FIFOs 25 are provided in the respective channels. Details of array-type processors 23 are disclosed in Japanese laid-open patent publication No. 2003-196246, for example. Stream processor 2 may not necessarily employ a plurality of array-type processors 23, but may employ a programmable logic circuit such as an FPGA (Field Programmable Gate Array), a CPLD (Complex Programmable Logic Device), or the like, or a hard-wired logic circuit, or a plurality of CPUs or DSPs insofar as they can perform a plurality of processes parallel to each other. Alternatively, stream processor 2 may employ a combination of a programmable logic circuit, a hard-wired logic circuit, CPUs, or DSPs.

In the present invention, as described above, the processor group may employ a plurality of array-type processors 23, or a plurality of CPUs or DSPs. A plurality of processor elements may employ a programmable logic circuit such as an FPGA or CPLD, or the like, or a hard-wired logic circuit. Even only one processor that has a plurality of processor elements is defined as the processor group.

Input DMA circuit 21 stores descriptor pointers representing addresses of memory 3 where descriptors are stored. The values of the descriptor pointers are set by CPU 1, for example, according to a program stored in memory 3. If CPU 1 asks stream processor 2 to perform a certain process, for example, then CPU 1 sets an address pointer indicative of the leading address of a descriptor to be processed, as a descriptor pointer in input DMA circuit 21.

According to the value of the descriptor pointer that has initially been set by CPU 1, input DMA circuit 21 reads the descriptor from memory 3, reads data to be processed from memory 3 based on various information of the descriptor, and transfers the read data to input FIFO 24 in the channel specified for array-type processor 23.

Figure 3:
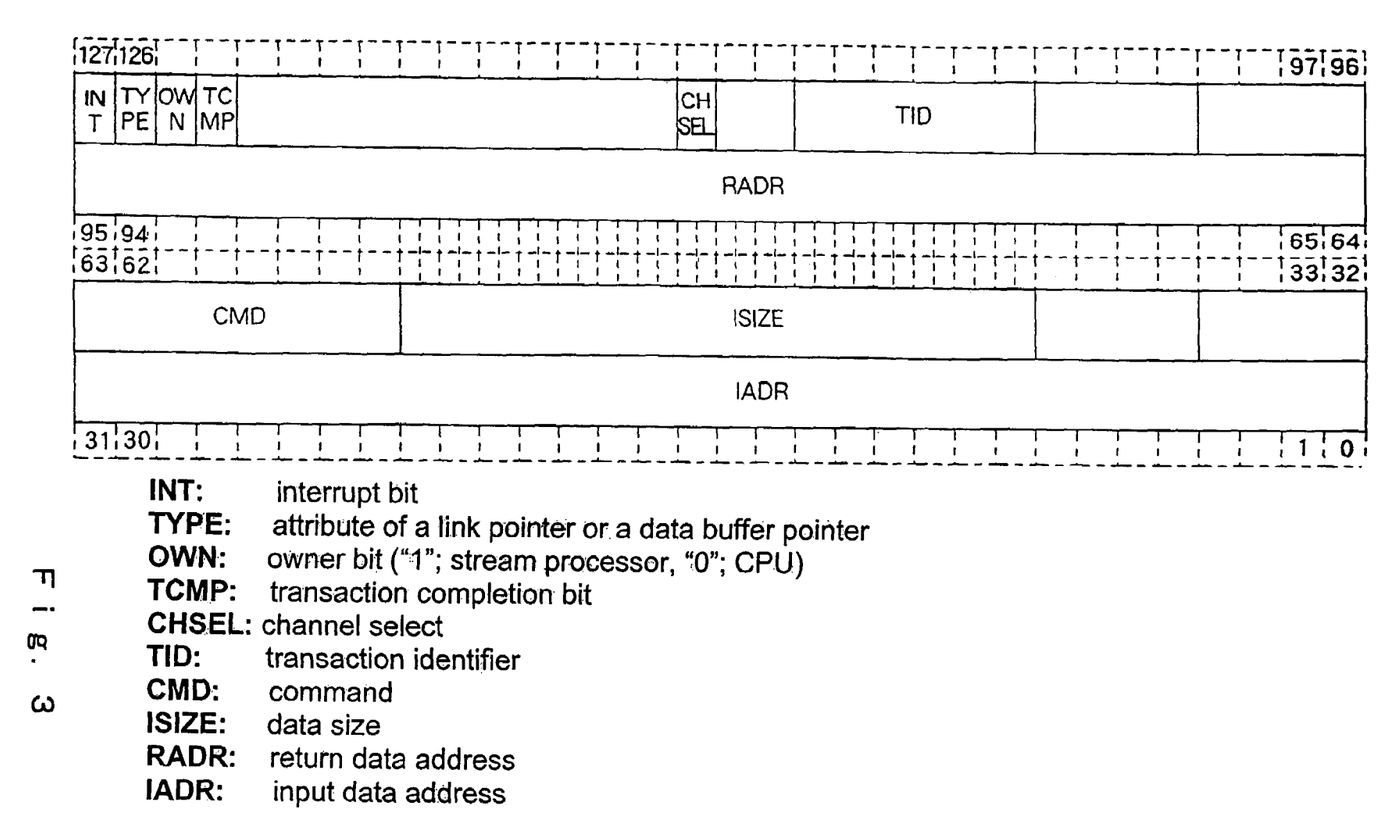
FIG. 3 is a diagram showing the format of a descriptor used in the information processing apparatus shown in FIG. 2.

FIG. 3 schematically shows the format of a descriptor used in the information processing apparatus shown in FIG. 2. In FIG. 3, the descriptor is of 128 bits. However, the amount of information represented by the descriptor may be changed depending on the width of bits processed by CPU 1 and array-type processors 23 or the size of the memory space in memory 3. In FIG. 3, areas free of field names are idle areas used as reserves.

As shown in FIG. 3, the descriptor used in the present embodiment has a plurality of fields represented by INT (interrupt bit), TYPE (attribute bit), OWN (owner bit), TCMP (transaction completion bit), CHSEL (channel select), TID (transaction identifier), CMD (command), ISIZE (data size), RADR (return data address [output address information]), and IADR (input data address [input address information]).

TID (transaction identifier) represents a field storing identifier data to be processed by stream processor 2. The value of TID is supplied together with data to be processed (input data) to input FIFOs 24, and output together with processed data (output data) from array-type processors 23.

CHSEL (channel select) represents a field for indicating a channel to process data read from memory 3, and has a number of bits depending on the number of the channels, i.e., the number of array-type processors 23. The data read from memory 3 by input DMA circuit 21 is supplied to input FIFO 24 in a channel specified by CHSEL.

IADR (input data address) represents a field for storing a data buffer pointer indicating the address of a storage area that stores data (input data) to be processed by stream processor 2. RADR (return data address) represents a field for storing a data buffer pointer indicating the address of a storage area that stores data (output data) processed by stream processor 2. ISIZE represents a field for storing information that indicates the data size to be processed by stream processor 2.

Stream processor 2 reads size of the data to be processed indicated by ISIZE from the address indicated by IADR, and supplies the read data (input data) to input FIFO 24 indicated by CHSEL. Stream processor 2 stores data processed by array-type processors 23 into a memory area whose starting address is indicated by RADR.

According to the present embodiment, since the descriptor includes a data buffer pointer (input address information) indicative of a storage area for storing data to be processed and a data buffer pointer (output address information) indicative of a storage area for storing processed data, it is possible to manage an association between input data to be supplied to stream processor 2 and output data output from stream processor 2. Therefore, when the information processing apparatus performs a plurality of processes parallel to each other, it can recognize which input data have produced processed output data.

OWN (owner bit) is a bit indicative of whether the data access privileges are owned by CPU 1 or stream processor 2. For example, if the data access privileges are owned by stream processor 2, then the OWN bit is set to "1", and if the data access privileges are owned by CPU 1, then the OWN bit is set to "0".

TCMP (transaction completion bit) is a bit which becomes effective when the transfer of the data processed by stream processor 2 to the address indicated by RADR is completed.

CPU 1 asks stream processor 2 to perform a process by setting a descriptor pointer corresponding to data to be processed, receives the data processed by stream processor 2, and uses the received data in another process. Since data always contains a unique descriptor corresponding thereto, CPU 1 can confirm how the data is processed by monitoring the descriptor on memory 3. For example, if the OWN bit of a descriptor which is being monitored is "0" and the TCMP bit thereof is "0", then it indicate that the transfer of the data to array-type processors 23 is not completed. If the OWN bit is "0" and the TCMP bit is "1", then it indicate that the transfer of the data to array-type processors 23 is completed. If the OWN bit is "1" and the TCMP bit is "0", then it indicate that the data is being transferred to array-type processors 23. If the OWN bit is "1" and the TCMP bit is "1", then it indicate that the processing of the data in stream processor 2 is completed. When CPU 1 generates a descriptor, it sets the OWN bit to "0" and the TCMP bit to "0" in the descriptor. CPU 1 may monitor each descriptor by either polling the descriptor (to read the descriptors from the memory 3 and to confirm the details of the descriptors in a predetermined period) or by using an interrupt signal that can be generated by stream processor 2 each time the OWN bit and the TCMP bit are rewritten. According to the present invention, however, since the information processing apparatus performs a plurality of processes parallel to each other, CPU 1 has to undergo wasteful processing if descriptors corresponding to processes that CPU 1 has asked stream processor 2 to perform are polled one by one in sequence. Specifically, when CPU 1 waits for the OWN bit to become "1" and the TCMP bit to become "1" in each of the descriptors corresponding to the processes that CPU 1 has asked stream processor 2 to perform, CPU 1 is unable to detect the status of another process that has been completed earlier because the processing time is too short. For polling a plurality of descriptors, therefore, it is desirable to poll the descriptors alternately in each predetermined period.

According to the present embodiment, by using the OWN bit and the TCMP bit, it is possible to easily arbitrate conflicts between CPU 1 and stream processor 2 with respect to the same data, allowing CPU 1 and stream processor 2 to share the data. Because the completion of processing of data at an address by stream processor 2 and the start of processing of the data at the same address by CPU 1 can be synchronized with each other, the information processing apparatus has improved performance.

CMD (command) represents a field for indicating the type of a process to stream processor 2. Based on the information of CMD (command), stream processor 2 selects the type of a process for an indicated channel from a plurality of applications (process types) that can be executed by array-type processors 23.

INT (interrupt bit) is a bit used to generate an interrupt signal to indicate to CPU 1 the completion of a process by stream processor 2. TYPE (attribute bit) is a bit used to maintain a descriptor queue structure, to be described later, which is constructed in memory 3.

As described above, stream processor 2 of the information processing apparatus according to the present invention is arranged so that it can perform a plurality of processes parallel to each other. The processing efficiency of the information processing apparatus is maximum when data to be processed are successively given to stream processor 2. One process for efficiently transferring data to stream processor 2 is to construct a descriptor queue comprising a ring of successive descriptors stored in memory 3, as shown in FIG. 4.

Figure 4:
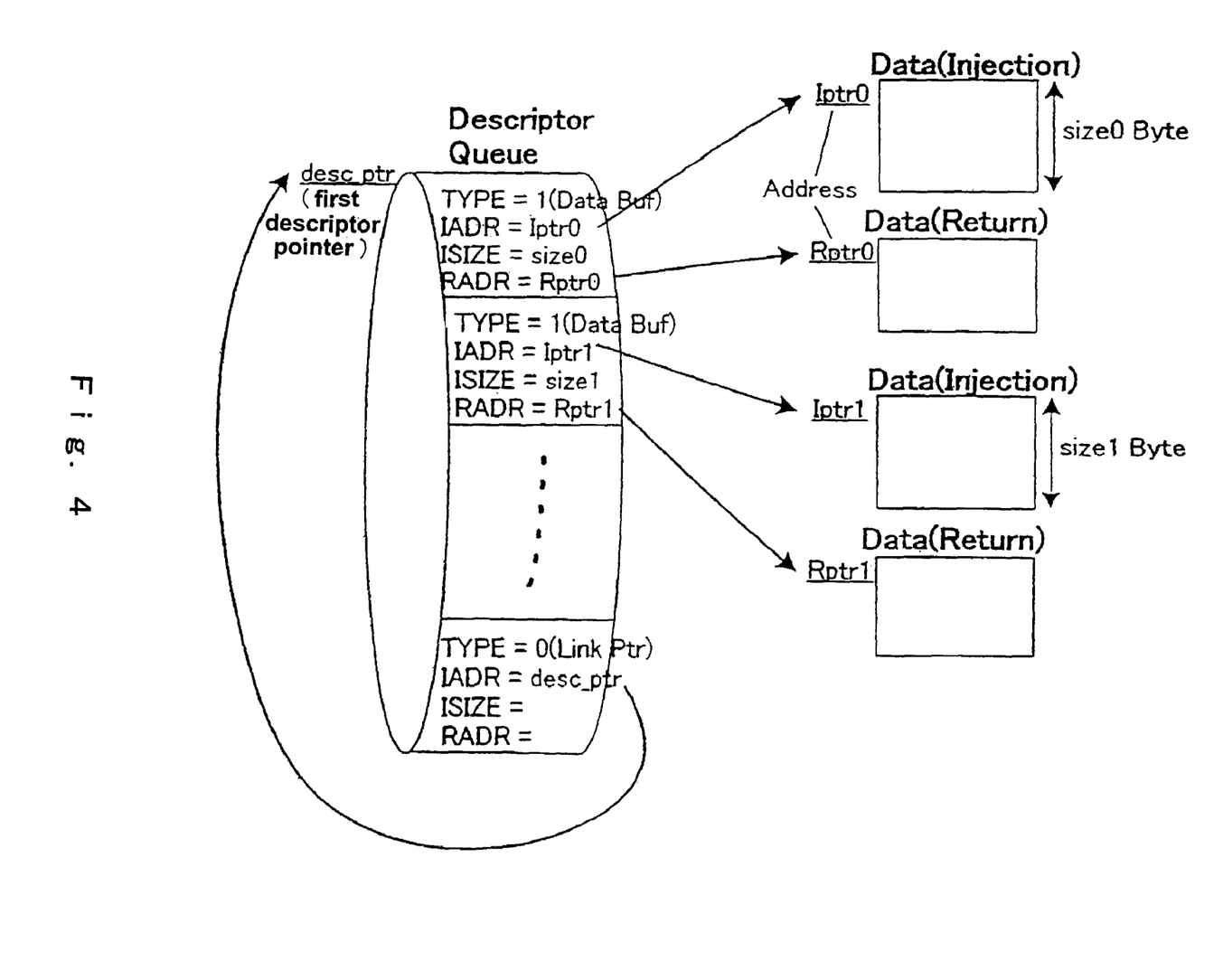
FIG. 4 is a diagram showing the format of a descriptor queue used in the information processing apparatus shown in FIG. 2.

FIG. 4 schematically shows the format of a descriptor queue used in the information processing apparatus shown in FIG. 2.

As described above, each descriptor according to the present embodiment has a data buffer pointer (IADR) for indicating an address for stored data to be processed, a data buffer pointer (RADR) for indicating an address for storing processed data, a data size field (ISIZE) for indicating data size, and a TYPE field for indicating whether IADR is a data buffer pointer or a link pointer. In FIG. 4, only these pointers and fields are described in each of the descriptors that make up the descriptor queue.

When the TYPE field of a descriptor is "1", it indicates that a data buffer pointer for accessing a data buffer (Data Buf) of memory 3, which stores effective data, is stored in IADR. When the TYPE field is "0", it indicates that a link pointer (Link Ptr) for accessing the next descriptor is stored in IADR.

In the ring-like descriptor queue shown in FIG. 4, the TYPE field of the final descriptor stores "0" and IADR thereof stores the address pointer of the first descriptor.

In FIG. 4, the first descriptor contains TYPE=1, IADR=Iptr0, ISZE=size0, and RADR=Rptr0, the second descriptor contains TYPE=1, IADR=Iptr1, ISZE=size1, and RADR=Rptr1, the nth (n is an integer of 1 or greater) descriptor contains TYPE=1, IADR=Iptr(n-1), ISZE=size (n-1), and RADR=Rptr(n-1), and the final descriptor contains TYPE=0 and IADR=desc ptr (the pointer of the first descriptor).

The descriptor queue is constructed by CPU 1 and stored in memory 3. When stream processor 2 processes data, the descriptors of the descriptor queue are successively read from memory 3, and data to be processed are successively supplied to stream processor 2 and processed thereby according to the descriptors. In this manner, the data can be efficiently transferred to array-type processors 23, and the data processed thereby can be efficiently stored back into memory 3. Consequently, the processing capability of the information processing apparatus is increased.

Input DMA circuit 21 of stream processor 2 has a function to increment the value of the descriptor pointer by a value corresponding to the data size (e.g., 128 bits) of the descriptor and to access a descriptor to be read next when the TYPE field of the descriptor is "1". Therefore, once CPU 1 sets a first descriptor pointer, input DMA circuit 21 is subsequently able to update the value of the descriptor pointer therein depending on the value of the TYPE field and to read a next descriptor without descriptor settings from CPU 1. If input DMA circuit 21 keeps incrementing the value of the descriptor pointer, then a large number of addresses would be required for storing descriptors. The number of addresses for storing descriptors can be reduced by constructing a descriptor queue comprising a ring of successive descriptors.

However, a descriptor queue does not need to be in the form of a ring of successive descriptors, but may be of any of various structures from which descriptors can successively be read for successively supplying data to be processed to stream processor 2. For example, a descriptor queue may be of a structure for successively reading descriptors stored at separate addresses. According to such a descriptor queue structure, the TYPE field of a final descriptor stored at an address may be set to "0" and a descriptor pointer at another address may be stored in the IADR field of the descriptor. Alternatively, a descriptor queue may be of a structure for successively reading descriptors stored at successive addresses. According to such a descriptor queue structure, the TYPE field of a final descriptor stored at an address may be set to "1". In this case, since input DMA circuit 21 increments the value of the descriptor pointer by a value corresponding to the data size and accesses a next descriptor, as described above, input DMA circuit 21 can successively read descriptors stored at one address after the next.

Figure 5A:
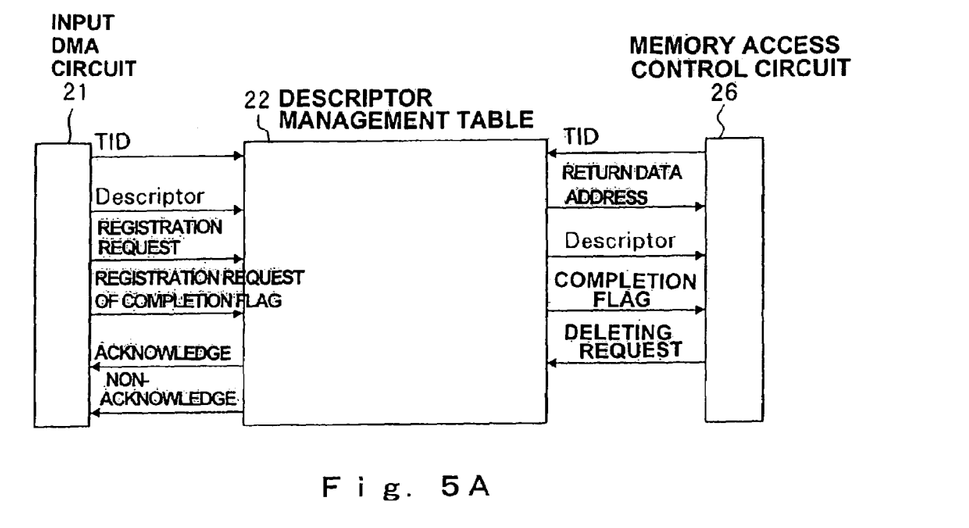
FIG. 5A is a block diagram showing by way of example signals input to and output from a descriptor management table in the information processing apparatus shown in FIG. 2.
Figure 5B:
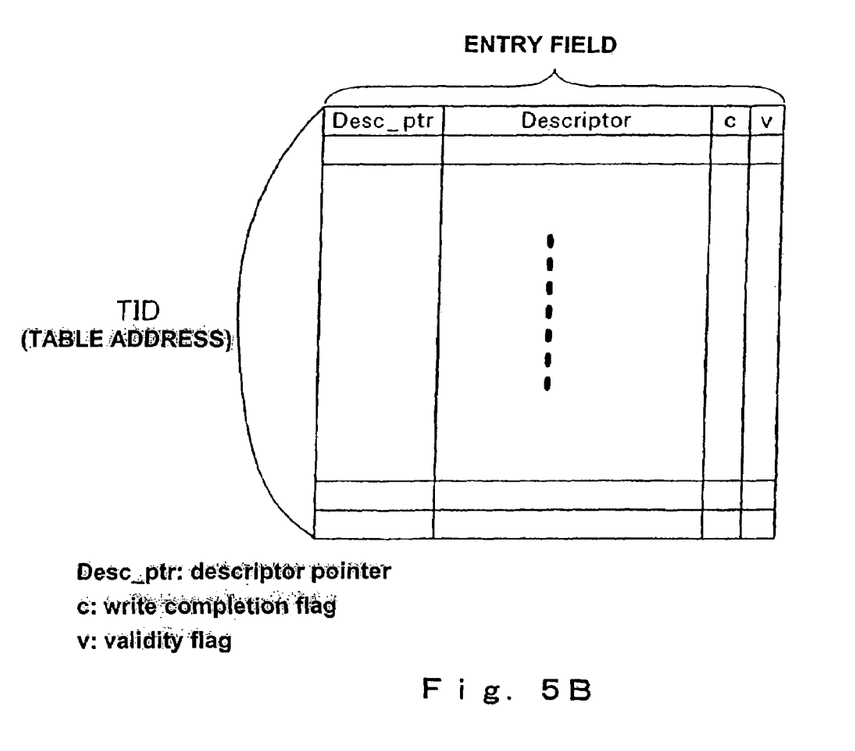
FIG. 5B is a diagram showing an entry field in the descriptor management table in the information processing apparatus shown in FIG. 2.

FIG. 5A shows in block form signals input to and output from descriptor management table 22 shown in FIG. 2, and FIG. 5B shows an entry field in descriptor management table 22.

As shown in FIG. 5B, descriptor management table 22 has an entry field for storing a plurality of descriptors read from memory 3. A descriptor read from memory 3 by input DMA circuit 21 is stored, together with a descriptor pointer (Desc ptr), a write completion flag (c), and a validity flag (v), into an entry having a table address TID.

As shown in FIG. 5A, input DMA circuit 21 supplies a descriptor registration request, TID, and a descriptor read from memory 3 to descriptor management table 22. Descriptor management table 22 confirms the validity bit (v) in the entry that corresponds to the table address TID transferred with the descriptor registration request. If the validity bit (v) is "0", i.e., if the information in the entry is invalid, then since the corresponding descriptor can be updated, descriptor management table 22 returns an "acknowledged" message, indicating that the descriptor registration request is permitted, to input DMA circuit 21, and stores the received descriptor into the entry corresponding to the TID. If the validity bit (v) is "1", i.e., if the information in the entry is valid, then since the corresponding descriptor cannot be updated (e.g., the descriptor is being accessed), descriptor management table 22 returns an "non-acknowledged" message, indicating that the descriptor registration request is not permitted, to input DMA circuit 21. In this case, input DMA circuit 21 repeatedly sends a descriptor registration request for a preset number of times or until a preset period of time has elapsed before the descriptor registration request is permitted. Alternatively, input DMA circuit 21 may discard the descriptor read from memory 3, read the same descriptor again from memory 3, without incrementing the value of the descriptor pointer, and request the registration of the descriptor.

When CPU 1 generates descriptors, it is desirable for CPU 1 to assign table addresses TID, which do not overlap each other, to the descriptors in order to reduce chances that the descriptor registration request will not be permitted. If table addresses TID overlap each other, then a descriptor registration request may be generated for an entry that is being processed, and input DMA circuit 21 may repeatedly send a descriptor registration request until the entry becomes invalid. In this case, stream processor 2 is unable to accept a next descriptor registration request until the preceding descriptor registration request is permitted. Consequently, at the time when processing by stream processor 2 is completed and CPU 1 can access the corresponding descriptor, CPU 1 should be able to assign the table address TID thereof to a descriptor used in another process.

After input DMA circuit 21 has registered a descriptor read from memory 3 in descriptor management table 22, input DMA circuit 21 extracts IADR and ISZE from the descriptor, reads data to be processed from memory 3 through bus 4, and transfers the data to input FIFO 24 in a channel specified by CHSEL. When input DMA circuit 21 transfers the data to array-type processors 23, input DMA circuit 21 attaches TID, CMD, and ISZE to the data. These items of information may be added to the first portion of the data, or may be transferred parallel to the data.

After input DMA circuit 21 has transferred all the data to be processed, which is indicated by the descriptor, to array-type processor 23, input DMA circuit 21 sends a request to register a completion flag, which indicates the completion of the transfer of all the data, to descriptor management table 22. Until descriptor management table 22 receives the completion flag registration request, descriptor management table 22 maintains a process of deleting the descriptor as requested by memory access control circuit 26 to be described later. Therefore, if all the data to be processed, which is indicated by the descriptor, is not transferred to array-type processor 23, then the entry is prevented from being deleted from descriptor management table 22 by memory access control circuit 26. In the absence of the above function, if a next descriptor arrives while processed data is being transferred to memory 3 and the table address TID thereof is identical to the descriptor data which has not been completely transferred to array-type processors 23, then the next descriptor is written over the corresponding entry in descriptor management table 22, possibly resulting in a malfunction.

Array-type processors 23 activate applications indicated by CMD received from input DMA circuit 21, process successively supplied data according to the activated applications, and successively output the processed data. At this time, array-type processors 23 may start processing data after having received all the data indicated by ISIZE, or may successively process data in the order they are received and output the processed data.

Array-type processors 23 output first processed data together with the table address TID and transfer the processed data to output FIFOs 25. Memory access control circuit 26 accesses descriptor management table 22 using a table address TID output from array-type processors 23, and extracts RADR (return data address) from the indicated descriptor. Then, memory access control circuit 26 stores the processed data output from array-type processors 23 into storage areas of memory 3 which start from the return data address RADR.

Memory access control circuit 26 can confirm that processing of the data has ended by receiving an end signal from array-type processors 23 that indicates the completion of data processing. Using the end signal, array-type processors 23 can perform a process in which the size of input data and the size of output data are not the same as each other. Processes in which the size of output data varies (variable-length size) with respect to the size of input data (fixed-length size) include a data compression process and a data expansion process. When the storage of final output data into memory 3 is finished, memory access control circuit 26 sends a request to delete the corresponding descriptor and the table address TID of the descriptor to be deleted to descriptor management table 22, setting the validity bit of the corresponding entry to "0" (invalid). Using the descriptor pointer, memory access control circuit 26 rewrites the TCMP bit of the corresponding descriptor to "1", allowing other devices, e.g., CPU 1, to recognize the completion of the process.

A descriptor read from memory 3 may be registered in each of array-type processors 23, rather than in descriptor management table 22. Even with such an arrangement, if processed data and the corresponding descriptor are transferred to memory access control circuit 26, then memory access control circuit 26 can store the processed data output from array-type processors 23 into storage areas starting from the return data address in the descriptor. However, each of array-type processors 23 needs to hold a descriptor containing a large amount of information (128 bits according to the present embodiment as shown in FIG. 3), and requires a buffer resource having a relatively large storage capacity. According to the present invention, therefore, descriptor management table 22 manages descriptors, and each of array-type processors 23 manages only table addresses TID used for identifying descriptors.

Inasmuch as stream processor 2 has descriptor management table 22, array-type processors 23 are not required to manage descriptors each containing a large amount of information, but are still able to identify an association between input data and output data. In addition, the cost of array-type processors 23 can be reduced because the storage capacity of the buffer resource required by array-type processors 23 can be reduced.

Operation of the information processing apparatus will be described in specific detail below with reference to FIG. 6.

Figure 6:
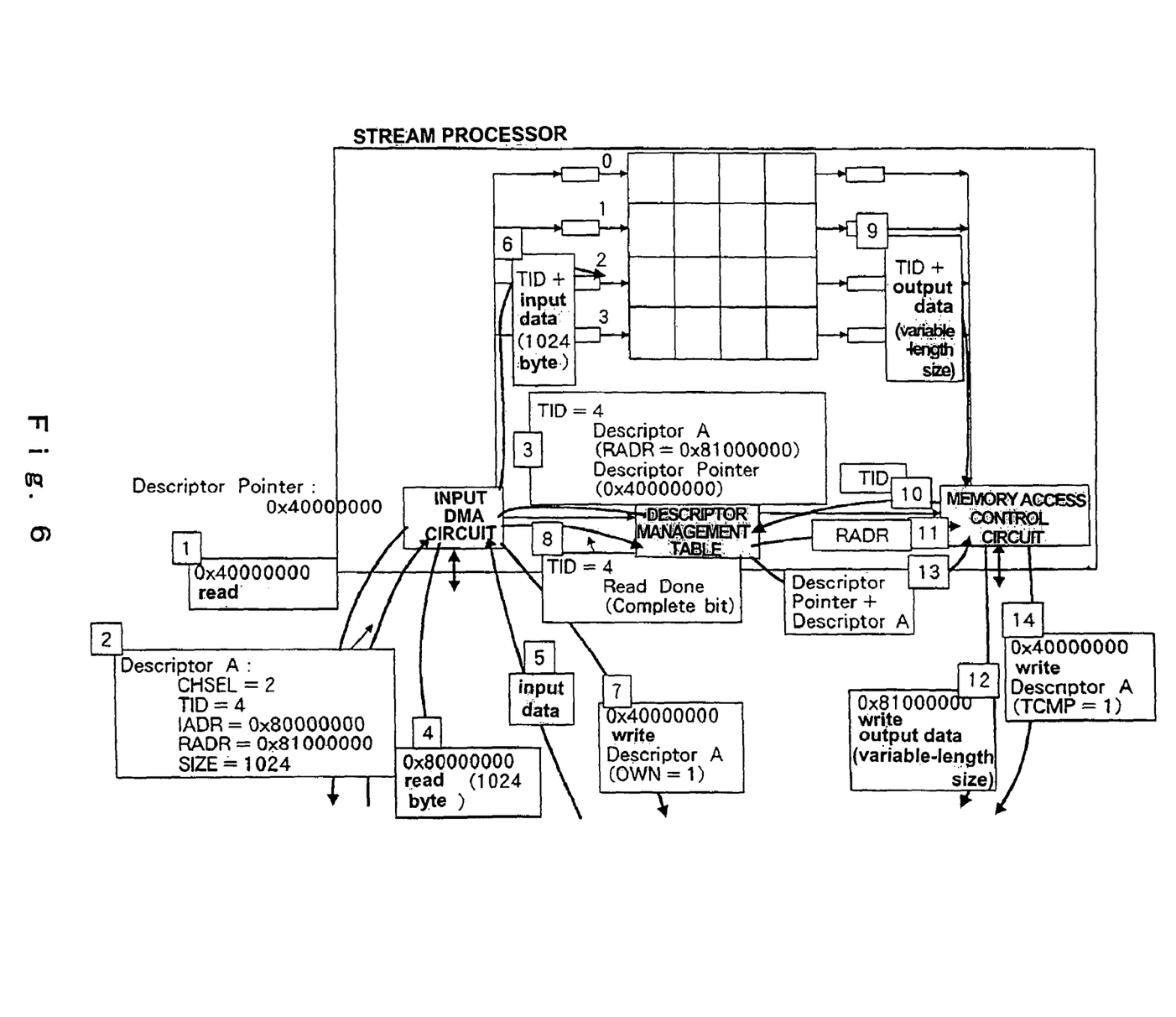
FIG. 6 is a diagram illustrative of the manner in which the information processing apparatus shown in FIG. 2 operates.

FIG. 6 schematically shows the manner in which the information processing apparatus shown in FIG. 2 operates. In addition to the information processing apparatus shown in block form in FIG. 2, FIG. 6 shows specific items of information sent and received in processing stages (1) through (14) described below. The numerical values given in the rectangular blocks shown in FIG. 6 are in agreement with the numerical values in the processing stages (1) through (14) described below.

(1) As shown in FIG. 6, when input DMA circuit 21 of stream processor 2 receives a processing request from CPU 1, for example, input DMA circuit 21 accesses an address (0x40000000 in FIG. 6) in memory 3 according to the value of a preset descriptor pointer, and reads the corresponding descriptor from memory 3.

(2) It is assumed that the descriptor (hereinafter referred to as "descriptor A") which is read from memory 3 by input DMA circuit 21 contains information CHSEL=2, TID=4, IADR=0x80000000, RADR=0x81000000, and ISZE=1024.

(3) After having read the descriptor from memory 3, input DMA circuit 21 registers descriptor A together with the descriptor pointer in descriptor management table 22. At this time, if input DMA circuit 21 is successful in registering descriptor A in descriptor management table 22, then input DMA circuit 21 increments the descriptor pointer and reads the next descriptor. If input DMA circuit 21 is not successful in registering descriptor A in descriptor management table 22, then input DMA circuit 21 discards the descriptor read from memory 3, reads the same descriptor again from memory 3 without incrementing the value of the descriptor pointer, and requests registration of the descriptor.

(4) Then, input DMA circuit 21 extracts IADR and ISIZE from read descriptor A, accesses memory 3, and requests memory 3 to read 1024-byte data indicated by ISIZE from the memory address (0x80000000) indicated by IADR. If there is a descriptor that has already been read, then input DMA circuit 21 can perform the processing in stage (4) on that descriptor while at the same performing the processing in stages (1) through (3).

(5) In response to the data readout request from input DMA circuit 21, memory 3 transfers the 1024-byte data to input DMA circuit 21 through bus 4. If stream processor 2 performs a plurality of processes parallel to each other, then it is possible to simultaneously access memory 3 by means of input DMA circuit 21 in the stage (4) and to transfer the data from memory 3 in stage (5).

(6) Input DMA circuit 21 supplies the data received from memory 3 to input FIFO 24 in the channel (=CH 2) indicated by CHSEL in descriptor A. At this time, input DMA circuit 21 supplies TID (=4) together with the data to input FIFO 24. Stream processor 2 performs a plurality of processes parallel to each other, then it is possible for input DMA circuit 21 to simultaneously receive the input data from memory 3 and to transfer the data to input FIFO 24.

(7) Subsequently, input DMA circuit 21 changes the OWN bit of descriptor A to "1" indicating that stream processor 2 has data access privileges and rewrites the descriptor A in memory 3 using a descriptor pointer.

(8) Then, input DMA circuit 21 sends a request to register a completion flag, which indicates the completion of the reading of all the data, to descriptor management table 22 and rewrites a write completion flag in the entry at TID=4 in descriptor management table 22 to "1".

(9) Array-type processors 23 successively process the data received from input DMA circuit 21, and output TID=4 together with the processed data. At this time, the size of the data output from array-type processors 23 may not necessarily be the same as the size of the data input thereto. Array-type processors 23 can output the processed data while receiving data from input DMA circuit 21.

(10) Memory access control circuit 26 transfers ID=4 output from array-type processors 24 to descriptor management table 22.

(11) Memory access control circuit 26 acquires RADR (0x81000000) from descriptor A corresponding to TID=4 that is registered in descriptor management table 22.

(12) Then, memory access control circuit 26 stores the data output from array-type processors 24 into addresses of memory 3 which start from RADR=0x81000000.

(13) After memory access control circuit 26 has stored all the data output from array-type processors 24 into memory 3, memory access control circuit 26 sends a request to delete the corresponding descriptor and TID of the descriptor to be deleted to descriptor management table 22, setting the validity bit of the corresponding entry to "0" (invalid). At this time, descriptor management table 22 confirms whether a completion flag registration request is issued from input DMA circuit 21 or not. If no completion flag registration request is issued, then descriptor management table 22 maintains the process of deleting the descriptor until a completion flag registration request is issued from input DMA circuit 21. If a completion flag registration request is issued from input DMA circuit 21, then descriptor management table 22 rewrites the validity bit of the entry, where corresponding descriptor A is stored, to "0" (invalid). At the same time, descriptor management table 22 prevents the TCMP bit of the corresponding descriptor from being updated to "1" in the subsequent process.

(14) Memory access control circuit 26 accesses memory 3 according to the descriptor pointer, rewrites the TCMP bit of descriptor A (0x40000000) to "1", and, if necessary, sends an interrupt signal to an external device such as CPU 1 (when INT=1). Memory access control circuit 26 is capable of performing processing at the above stages (10) through (14) while receiving output data from array-type processors 23 as described in stage (9).

The information processing apparatus according to the present invention can associate output data with input data even when it performs a plurality of processes parallel to each other because an association between the input data, i.e., data to be processed, and the output data, i.e. processed data, is managed using descriptors. The information processing apparatus with CPU 1 and stream processor 2 can achieve a throughput that CPU 1 alone is unable to provide. Since stream processor 2 can perform a plurality of processes parallel to each other, the information processing apparatus can provide a higher throughput. In particular, a queue of descriptors is constructed in memory 3 by CPU 1, and when stream processor 2 is to process data, the descriptors are successively read from memory 3, and the data to be processed are successively supplied to stream processor 2 based on the descriptors. Consequently, the data to be processed can be efficiently transferred to array-type processors 23, and the processed data can be efficiently stored back into memory 3. The information processing apparatus, therefore, has its processing capability improved.

Even when the information processing apparatus performs a single process, the overhead thereof is reduced because array-type processors 23 and CPU 1 are not required to set descriptors for transferring data by means of DMA unlike in conventional information processing apparatus. Consequently, the information processing apparatus according to the present invention has its processing capability improved compared with the conventional information processing apparatus even when the information processing apparatus performs a single process.

The information processing apparatus according to the present invention may have CPU 1, stream processor 2, memory 3, and bus 4 incorporated into a single semiconductor integrated circuit device, or may have the functions of these components implemented by a plurality of semiconductor integrated circuit devices.

The present invention includes in its scope, (a) a descriptor structure for reading data to be processed which is supplied to stream processor 2, (b) a program that is executed by CPU 1 for requesting stream processor 2 to process data, to input data, and to output data, (c) a program for controlling a processor (CPU or DSP) to realize the processing sequences of input DMA circuit 21, array-type processors 23, descriptor management table 22, and memory access control circuit 26 of stream processor 2, (d) a program that is executed by CPU 1 for controlling operation of stream processor 2, e.g., setting descriptor pointers for stream processor 2, and recording mediums for storing the programs described in (a) through (d) above.

While a preferred embodiment of the present invention has been described using specific terms, such description is for illustrative purposes only, and it is to be understood that changes and variations may be made without departing from the spirit or scope of the following claims.

What is claimed is:

1. An information processing apparatus comprising:
a memory for storing a plurality of descriptors, wherein each of said plurality of descriptors contains input address information that represents an address for storing data to be processed and output address information that represents an address for storing processed data; and
a stream processor for performing a plurality of processes parallel to each other by acquiring said plurality of descriptors from said memory, reading data to be processed from said memory according to said input address information contained in each of said plurality of descriptors, processing said data by a predetermined process, and storing the processed data back into said memory according to the output address information contained in each of said plurality of descriptors, and wherein said stream processor can process a plurality of said predetermined processes parallel to each other.

2. The information processing apparatus according to claim 1, wherein said stream processor comprises:
a processor group for performing said plurality of predetermined processes;
an input DMA circuit for acquiring said plurality of descriptors from said memory, reading data to be processed from said memory according to said input address information contained in each of said plurality of descriptors, and supplying the data to said processor group; and
a memory access control circuit for storing the processed data from said processor group back into said memory according to the output address information contained in each of said plurality of descriptors.

3. The information processing apparatus according to claim 2, wherein each of said plurality of descriptors includes an identifier for identifying said descriptors, wherein said stream processor has a descriptor management table for storing said plurality of descriptors acquired from said memory together with said identifier, wherein said input DMA circuit supplies said identifier together with each of said plurality of descriptors to said processor group, and wherein said memory access control circuit reads said output address information from the descriptors stored in said descriptor management table based on said identifier output from said processor group, and stores the processed data from said processor group back into said memory.

4. The information processing apparatus according to claim 3, wherein after said input DMA circuit transfers all the data to be processed, which is indicated by said plurality of descriptors, to said processor group, said input DMA circuit sends a completion signal indicating that the transfer of all the data is completed to said descriptor management table, and wherein said descriptor management table maintains a process for deleting the descriptors until said descriptor management table receives said completion signal from said input DMA circuit.

5. The information processing apparatus according to claim 3, wherein said processor group outputs an end signal that indicates that processing of the data has ended when the processing of the data to be processed, which is read according to said input address information contained in each of said plurality of descriptors, is completed.

6. The information processing apparatus according to claim 3, wherein each of said plurality of descriptors includes an owner bit indicating whether said stream processor owns privileges to access said data or not, and wherein after said input DMA circuit reads the data to be processed from said memory according to said input address information contained in each of said plurality of descriptors, said input DMA circuit updates said owner bit contained in said descriptors stored in said memory to a value indicating that said stream processor owns said privileges to access said data.

7. The information processing apparatus according to claim 3, wherein each of said plurality of descriptors includes a transaction completion bit indicating whether the transfer of the processed data to said memory according to said output address information is completed or not, and wherein after the transfer of the processed data to said memory is completed, said memory access control circuit sets the transaction completion bit contained in said descriptors to a value indicating completion of the transfer of the processed data by said processor group to said memory.

8. The information processing apparatus according to claim 3, further comprising:
a host processor for controlling operation of said stream processor; and wherein said host processor generates said plurality of descriptors so as to be successively readable by said stream processor and stores said descriptors in said memory.

9. The information processing apparatus according to claim 8, wherein said host processor alternately polls a plurality of descriptors which correspond to data being processed by said stream processor; and monitors said owner bit and said transaction completion bit in said plurality of each descriptors.

10. The information processing apparatus according to claim 8, wherein when the processing of the data by said stream processor is completed and said host processor is able to access the descriptor which corresponds to the data, said host processor assigns said identifier for identifying said descriptor with a descriptor which corresponds to other data to be processed.

11. The information processing apparatus according to claim 1, wherein said stream processor has a table memory for storing the descriptors corresponding to the performing processes.

12. The information processing apparatus according to claim 11, wherein each of said plurality of descriptors includes the identifier for identifying said descriptors, and wherein said table memory is a descriptor management table for storing said plurality of descriptors acquired from said memory together with said identifier which corresponds to the descriptor.

13. The information processing apparatus according to claim 3, wherein said processor group comprises:
at least one of an array-type processor, a programmable logic circuit, a hard-wired logic circuit, a CPU, and a DSP.

14. A stream processor for performing a plurality of processes parallel to each other on data read from a memory, comprising:
a means for reading data to be processed from said memory according to an input address information contained in a plurality of descriptors, processing said data by predetermined process, and storing the processed data back into said memory according to an output address information contained in each of said plurality of descriptors, wherein each of said plurality of descriptors includes said input address information and said output address information, and wherein said stream processor can process a plurality of said predetermined processes parallel to each other.

15. The stream processor according to claim 14, further comprising:
a processor group for performing said plurality of predetermined processes;
an input DMA circuit for acquiring said plurality of descriptors from said memory, reading data to be processed from said memory according to said input address information contained in each of said plurality of descriptors, and supplying the data to said processor group; and
a memory access control circuit for storing the processed data from said processor group back into said memory according to said output address information contained in each of said plurality of descriptors.

16. The stream processor according to claim 15, further comprising:
a descriptor management table for storing each of said plurality of descriptors acquired from said memory together with an identifier for identifying each of said plurality of descriptors, wherein said input DMA circuit supplies said identifier together with said data to be processed to said processor group, and wherein said memory access control circuit reads said output address information from the descriptor which corresponds to said output address information stored in said descriptor management table based on said identifier output from said processor group, and stores the processed data from said processor group back into said memory.

17. The stream processor according to claim 15, wherein after said input DMA circuit transfers all the data to be processed which is indicated by said plurality of descriptors to said processor group, said input DMA circuit sends a completion signal indicating that the transfer of all the data is completed to said descriptor management table, and wherein said descriptor management table maintains a process for deleting the descriptors until said descriptor management table receives said completion signal from said input DMA circuit.

18. The stream processor according to claim 15, wherein said processor group outputs an end signal that indicates that processing of the data has ended when the processing of the data to be processed, which is read according to said input address information contained in each of said plurality of descriptors, is completed.

19. The stream processor according to claim 15, wherein each of said plurality of descriptors includes an owner bit indicating whether said stream processor owns privileges to access said data or not, and wherein after said input DMA circuit reads the data to be processed from said memory according to said input address information contained in said descriptors, said input DMA circuit updates said owner bit contained in said descriptors stored in said memory to a value indicating that said stream processor owns said privileges to access said data.

20. The stream processor according to claim 18, wherein each of said plurality of descriptors includes a transaction completion bit indicating whether the transfer of the processed data to said memory according to said output address information is completed or not, and wherein after the transfer of the processed data to said memory is completed, said memory access control circuit sets the transaction completion bit contained in said descriptors to a value indicating completion of the transfer of the processed data by said processor group to said memory.

21. The stream processor according to claim 15, further comprising:
a table memory for storing the descriptors corresponding to the performing processes.

22. The stream processor according to claim 15, wherein each of said plurality of descriptors includes the identifier for identifying said descriptors, and wherein said table memory is a descriptor management table for storing said plurality of descriptors acquired from said memory together with said identifier which corresponds to the descriptor.

23. A program for controlling an information processing apparatus having a memory for storing a plurality of descriptors, wherein each of said plurality of descriptors contains input address information that represents an address for storing data to be processed and output address information that represents an address for storing processed data, a stream processor for performing a plurality of processes parallel to each other by acquiring said plurality of descriptors from said memory, reading data to be processed from said memory according to said input address information contained in each of said plurality of descriptors, processing said data by predetermined process, and storing the processed data back into said memory according to the output address information contained in each of said plurality of descriptors, said stream processor can process a plurality of said predetermined processes parallel to each other, and a host processor for controlling operation of said stream processor, said program being executable by said host processor and comprising the steps of:
generating a plurality of descriptors which are successively readable by said stream processor; and
storing said plurality of descriptors in said memory.

24. The program according to claim 23, further comprising the steps of:
generating said plurality of descriptors so as to include an owner bit indicating whether said stream processor owns privileges to access said data or not, and a transaction completion bit indicating whether the transfer of the processed data to said memory according to said output address information is completed or not;
alternately polling said plurality of descriptors which correspond to data being processed by said stream processor; and
monitoring said owner bit and said transaction completion bit in each of said descriptors.

25. The program according to claim 23, further comprising the step of:
when processing of the data by said stream processor is completed and said host processor is able to access the descriptor which corresponds to the data, assigning the identifier for identifying said descriptor to a descriptor which corresponds to other data to be processed.

26. The program according to claim 24, further comprising the step of:
when processing of the data by said stream processor is completed and said host processor is able to access the descriptor which corresponds to the data, assigning the identifier for identifying said descriptor to a descriptor which corresponds to other data to be processed.

* * * * *